(12) United States Patent
Kwon

(10) Patent No.: US 7,874,713 B2
(45) Date of Patent: Jan. 25, 2011

(54) BI-COLOR ILLUMINATED WHEEL EMBLEM

(76) Inventor: Young Chul Kwon, 17346 Boswell Pl., Granada Hills, CA (US) 91344

( * ) Notice: Subject to any disclaimer, the term of this patent is extended or adjusted under 35 U.S.C. 154(b) by 297 days.

(21) Appl. No.: 12/235,823

(22) Filed: Sep. 23, 2008

(65) Prior Publication Data
US 2010/0073946 A1   Mar. 25, 2010

(51) Int. Cl.
*B60Q 1/26* (2006.01)
(52) U.S. Cl. ........................ 362/500; 362/464
(58) Field of Classification Search .............. 362/464, 362/467, 469, 473, 500
See application file for complete search history.

(56) References Cited
U.S. PATENT DOCUMENTS
2002/0136021 A1* 9/2002 Hung ..................... 362/500
2002/0172036 A1* 11/2002 Chien .................... 362/192
2004/0125612 A1* 7/2004 Jackson .................. 362/500
2004/0218397 A1* 11/2004 Luo ....................... 362/500

* cited by examiner

*Primary Examiner*—David V Bruce
(74) *Attorney, Agent, or Firm*—John K. Park; Park Law Firm

(57) ABSTRACT

A bi-color illuminated wheel emblem includes a rotating part that rotates together with the wheel, a stationary part that remains stationary when the automobile is moving, a bi-color illuminated display that is attached to the stationary part and an electric power supply. The rotating part comprises a mounting device that mounts the emblem to the wheel and a shaft that holds the stationary part rotatably. The stationary part comprises a hollow shell that is held by the shaft and a weight that is attached to the shell. The bi-color illuminated display comprises a metal look layer, illuminating elements and a light diffusion layer that diffuses light from the illuminating elements. The electric power supply comprises a stator that is attached to the stationary part and a rotor that is attached to the rotating part.

12 Claims, 3 Drawing Sheets

BI-COLOR ILLUMINATED WHEEL EMBLEM

BACKGROUND OF THE INVENTION

This invention is related to an emblem that is installed on a wheel of an automobile. More particularly, the invention is related to a bi-color illuminated wheel emblem that has a first look as a non-illuminated ordinary emblem in day time, and a second look as an illuminated emblem in night time. The first look and the second look have different colors.

A wheel emblem is used to provide a unique look to an automobile. Some luxury automotive manufactures use wheel emblems to illustrate authenticity, which shows a static appearance of the manufacturer's mark while the wheels are rotating.

Illuminated wheel emblems are also provided to emphasize the dynamic feeling of a moving automobile at night time. Incorporation of features into wheel emblems are challenging due to the limited space in the wheel and mechanical structure of the wheels which rotate at high speed. A wheel emblem that provides robust operation with outstanding decorative effects has long been in need.

SUMMARY OF THE INVENTION

The present invention contrives to solve the disadvantages of the prior art.

An objective of the invention is to provide a bi-color illuminated wheel emblem that integrates typical day time look of an automotive emblem with back lighted night time look of an automotive part.

Another objective of the invention is to provide a bi-color illuminated wheel emblem that can provide uniform and sufficiently bright illuminated portion.

In order to achieve the above objective, the present invention provides a bi-color illuminated wheel emblem, which is adapted to be installed on wheels of an automobile, comprising a rotating part that is adapted to rotate together with the wheel when the automobile is moving, a stationary part that remains stationary when the automobile is moving, a bi-color illuminated display that is attached to the stationary part and an electric power supply that supplies electric energy to the bi-color illuminated display.

The rotating part comprises a mounting device that is adapted to mount the emblem to the wheel and a shaft that holds the stationary part rotatably.

The stationary part comprises a hollow shell that is rotatably held by the shaft and a weight that is attached to the shell. The center of gravity of the weight is spaced from the center of the gravity of the shell whereby the shell is kept from rotating.

The bi-color illuminated display comprises a metal look layer, a substrate layer that supports the metal look layer, one or more illuminating elements and a light diffusion layer that diffuses light from the illuminating elements. The metal look layer and the substrate layer pass light from the illuminating elements.

The electric power supply comprises a stator that is attached to the stationary part and a rotor that is attached to the rotating part.

The electric power supply further comprises a rechargeable battery. The rechargeable battery is recharged by the electricity generated by the stator and the rotor.

The electric power supply further comprises a motion sensor that is adapted to sense start and stop of the automobile, and a power controller that controls intensity of electric power and timing of power supply according to the output of the motion sensor.

Alternatively, the motion sensor is adapted to sense speed of the automobile, and the power controller controls intensity of electric power and timing of power supply according to the output of the motion sensor.

The stationary part further comprises an annular ring that comprises one or more slots through which light from the illuminating elements pass.

The rechargeable battery is attached to the weight.

The bi-color illuminated display further comprises a non-metal look colored portion that is adjacent to the metal-look portion.

The metal look layer comprises a metal coated sheet.

The bi-color illuminated display further comprises a clear coating on top of the metal look layer.

The light diffusion layer comprises a plurality of tooth elements that are adapted to refract light from the illuminating elements in various directions.

The illuminated wheel emblem provides unique decoration effect that is combined with dynamics of a moving automobile. The wheel emblem displays stationary image of an automobile manufacturer or other symbols that a user wants. The illuminated wheel emblem of the present invention provides the same look and satisfies design requirement of emblem for major automotive companies. That is, the emblem has shiny metal and brilliant color look.

The illuminated emblem further provides outstanding decoration effect at dark environment by emitting bright and colored light.

The emblem can be provided in many different shape and structure. The outer surface of the emblem may be flat or include convex and concave portions.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

The disclosures of U.S. Patent Application Publication No. US2005/0195612 and U.S. patent application Ser. No. 12/059,134, which is filed on Mar. 31, 2008 by the inventor, are incorporated by reference into this specification, as if they are fully set forth herein.

Figure 1:
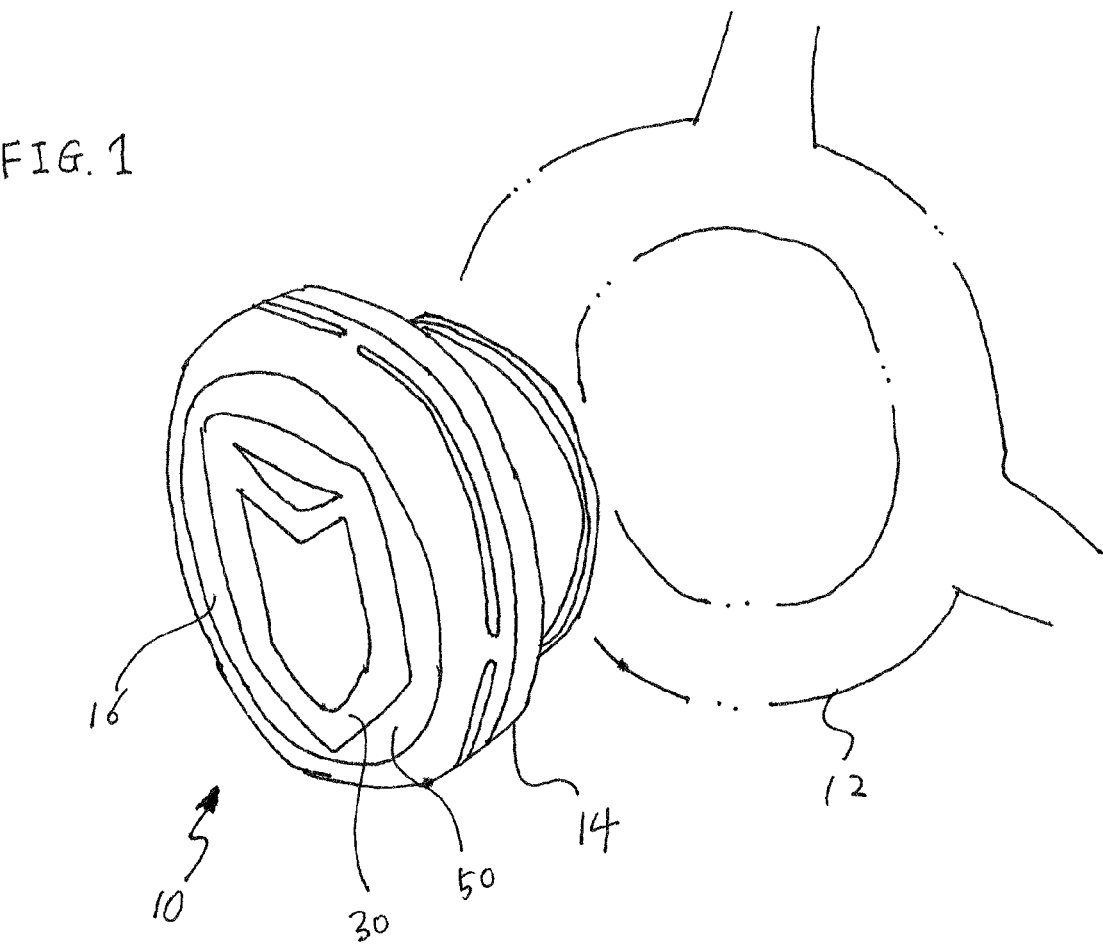
FIG. 1 is a perspective view showing an illuminated wheel emblem of the present invention.
Figure 2:
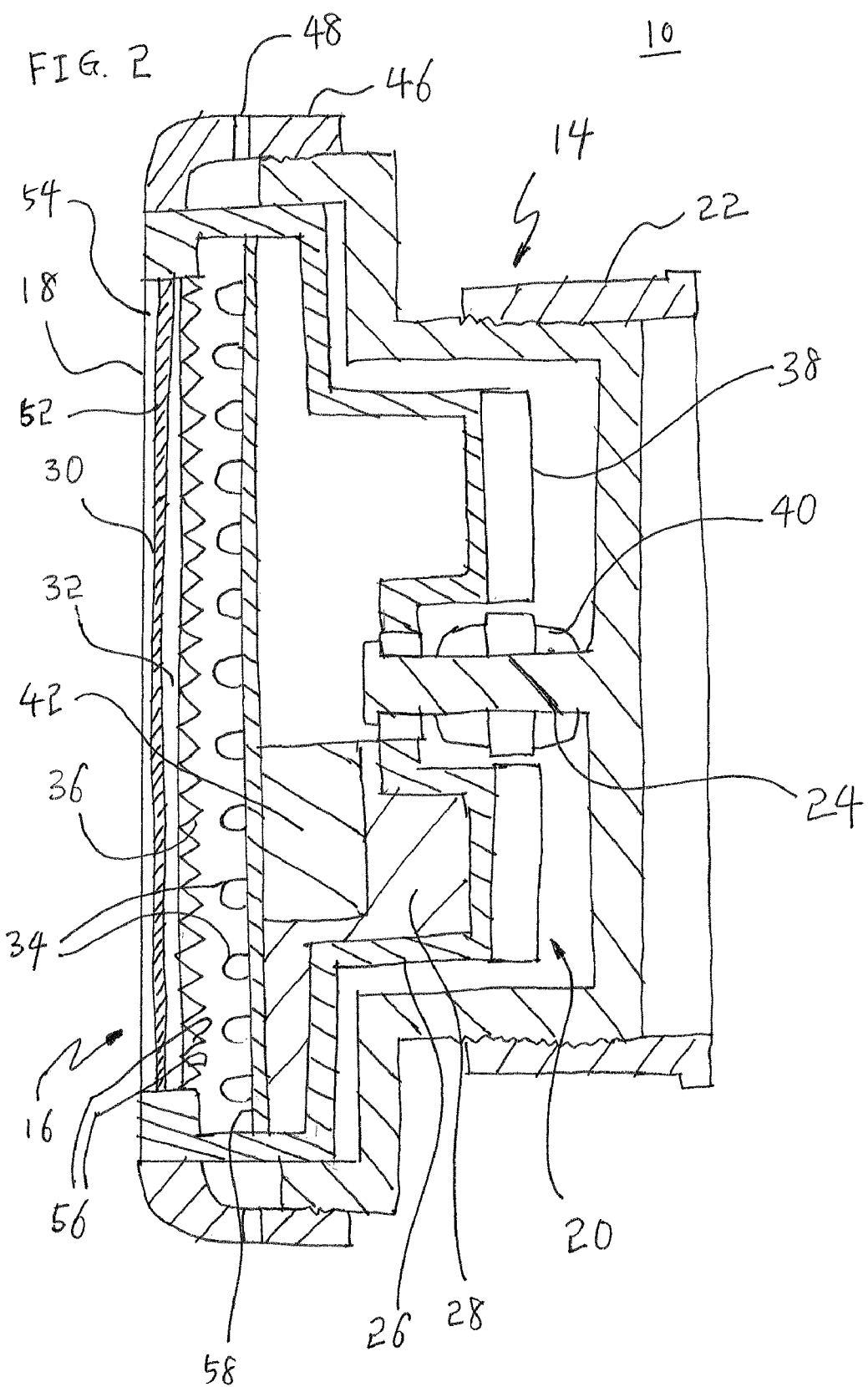
FIG. 2 is a cross-sectional view showing the structure of the illuminated wheel emblem.

FIG. 1 shows a bi-color illuminated wheel emblem 10, which is adapted to be installed on wheels 12 of an automobile. FIG. 2 shows that the wheel emblem 10 comprises a rotating part 14 that is adapted to rotate together with the wheel 12 when the automobile is moving, a stationary part 16 that remains stationary when the automobile is moving, a bi-color illuminated display 18 that is attached to the stationary part 16 and an electric power supply 20 that supplies electric energy to the bi-color illuminated display 18.

The rotating part 14 comprises a mounting device 22 that is adapted to mount the emblem 10 to the wheel 12 and a shaft 24 that holds the stationary part 16 rotatably. The mounting device 22 enables mounting of the emblem 10 on many different sizes of wheel cap openings.

The stationary part 16 comprises a hollow shell 26 that is rotatably held by the shaft 24 and a weight 28 that is attached to the shell 26. The center of gravity of the weight 28 is spaced from the center of the gravity of the shell 26 whereby the shell 26 is kept from rotating.

The bi-color illuminated display 18 comprises a metal look layer 30, a substrate layer 32 that supports the metal look layer 30, one or more illuminating elements 34 and a light diffusion layer 36 that diffuses light from the illuminating elements 34. The metal look layer 30 and the substrate layer 32 pass light from the illuminating elements 34. The metal look layer 30 provides shiny metallic look at day time, and provides illuminated colored shape at night time.

The electric power supply 20 comprises a stator 38 that is attached to the stationary part 16 and a rotor 40 that is attached to the rotating part 14. The stator 38 and the rotor 40 constitute an electric generator.

Figure 3:
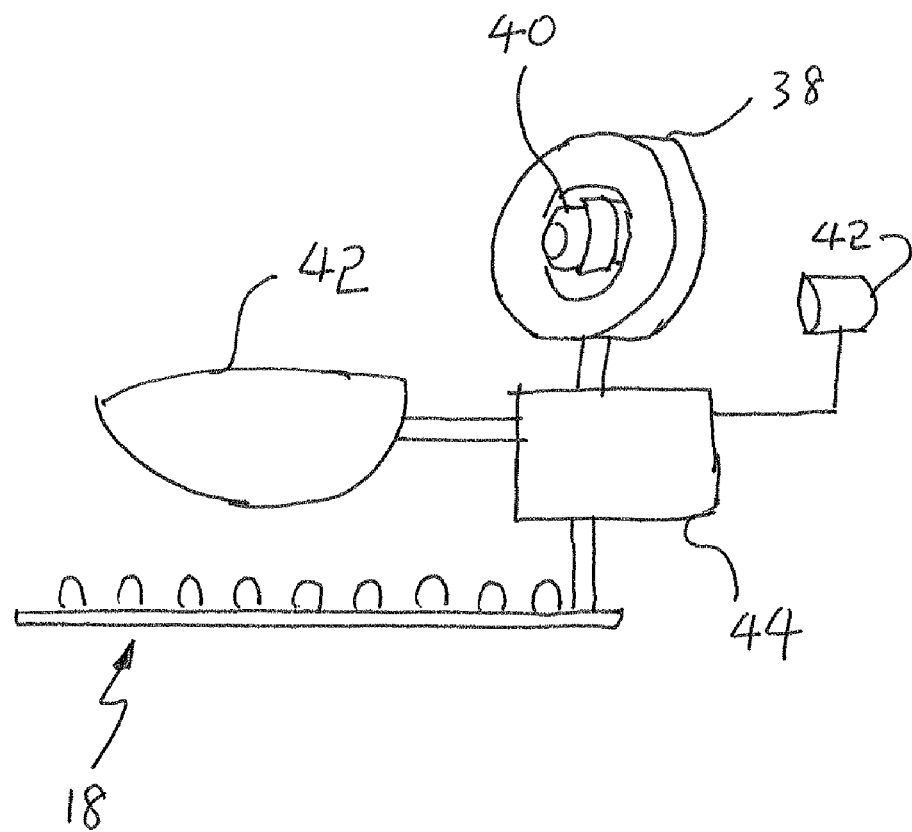
FIG. 3 is a block diagram showing electric operation of the illuminated wheel emblem.

The electric power supply 20 further comprises a rechargeable battery 41. The rechargeable battery 41 is recharged by the electricity generated by the stator 38 and the rotor 40. FIG. 3 shows that the electric power supply 20 further comprises a motion sensor 42 that is adapted to sense start and stop of the automobile, and a power controller 44 that controls intensity of electric power and timing of power supply according to the output of the motion sensor 42. The decoration effect of wheel emblem 10 is most noticed when the automobile starts to be driven or came to a stop. However, the electricity generated by the rotation of the rotor is weakest when the rotational speed of the wheel is slow such and start and stopping of the automobile. The rechargeable battery 41 provides electric power required to power the bicolor illuminated display 18 when the speed of the automobile is low. The power controller 44 adjusts the intensity and supply timing of electric current for best decoration effect for time period around start/stop of an automobile.

Alternatively, the motion sensor 42 is adapted to sense speed of the automobile, and the power controller 44 controls intensity of electric power and timing of power supply 20 according to the output of the motion sensor 42. This scheme can provide a more gradual and versatile decoration effect.

The stationary part 16 further comprises an annular ring 46 that comprises one or more slots 48 through which light from the illuminating elements 34 pass. The light thorough the slots looks as a bright ring when the automobile is moving.

FIG. 2 shows that the rechargeable battery 41 is attached to the weight 28, thereby adding to the gravitational force applied on the weight 28.

The bi-color illuminated display 18 further comprises a non-metal look colored portion 50 that is adjacent to the metal-look layer 30.

The metal look layer 30 comprises a metal coated sheet 52.

The bi-color illuminated display 18 further comprises a clear coating 54 on top of the metal look layer 30.

The light diffusion layer 36 comprises a plurality of tooth elements 56 that are adapted to refract light from the illuminating elements in various directions.

The substrate layer 32 provides a medium on which the metal look layer 30 is firmly attached. Alternatively, the substrate layer 32, itself may be used for bi-color display without the metal look layer 30. A plastic sheet having a commercial name 'Superglas Dulight' may be used as the substrate layer.

The property of Dulight is well explained in Korean Patent No. 10-0596325, the disclosure of which is incorporated by reference.

The metal look layer 30 is provided as a metal coated sheet, or is vacuum evaporation coated on the substrate layer 32. The metal coating is made in a density that allows back illuminating. A sheet that is commonly called 'solar paper' may be used as the metal look layer 30.

The clear coating 54 is provided for protection and for more realistic look. The clear coating renders the multi-layer structure of the emblem like a sold metal emblem. The clear coating is made of epoxy.

The substrate layer 32 and the light diffusion layer 36 are integrated and are molded of clear polycarbonate.

The bi-color illuminated display further includes a base 58 on which the illuminating elements 34 are attached, and the illuminating element comprises an LED. For the illuminating element 34, an LED is used for satisfying durability, brightness, and color requirement of the emblem.

The bi-color illuminated emblem 10 can also be used for other vehicles including a bicycle. While the invention is described as being installed in a space for a wheel cap of a wheel for an automobile, other design is possible. For example, the stationary part can be attached to an axis of a bicycle around which a wheel of the bicycle rotates and the rotating part can be attached to wheel.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A bi-color illuminated wheel emblem, which is adapted to be installed on wheels of an automobile, comprising:
   a) a rotating part that is adapted to rotate together with the wheel when the automobile is moving;
   b) a stationary part that remains stationary when the automobile is moving;
   c) a bi-color illuminated display that is attached to the stationary part; and
   d) an electric power supply that supplies electric energy to the bi-color illuminated display;
   wherein the rotating part comprises:
   i) a mounting device that is adapted to mount the emblem to the wheel;
   ii) a shaft that holds the stationary part rotatably;
   wherein the stationary part comprises:
   iii) a hollow shell that is rotatably held by the shaft;
   iv) a weight that is attached to the shell, wherein the center of gravity of the weight is spaced from the center of the gravity of the shell whereby the shell is kept from rotating;
   wherein the bi-color illuminated display comprises:
   v) a metal look layer;
   vi) one or more illuminating elements; and
   vii) a light diffusion layer that diffuses light from the illuminating elements, wherein the metal look layer passes light from the illuminating elements.
   wherein the electric power supply comprises:
   ix) a stator that is attached to the stationary part; and
   x) a rotor that is attached to the rotating part.

2. The bi-color illuminated wheel emblem of claim 1, wherein the electric power supply further comprises a rechargeable battery, wherein the rechargeable battery is recharged by the electricity generated by the stator and the rotor.

3. The bi-color illuminated wheel emblem of claim 2, wherein the electric power supply further comprises a motion sensor that is adapted to sense start and stop of the automobile.

4. The bi-color illuminated wheel emblem of claim 3, wherein the electric power supply further comprise a power controller that controls intensity of electric power and timing of power supply according to the output of the motion sensor.

5. The bi-color illuminated wheel emblem of claim 2, wherein the electric power supply further comprises a motion sensor that is adapted to sense speed of the automobile.

6. The bi-color illuminated wheel emblem of claim 5, wherein the electric power supply further comprise a power controller that controls intensity of electric power and timing of power supply according to the output of the motion sensor.

7. The bi-color illuminated wheel emblem of claim 2, wherein the stationary part further comprises an annular ring that comprises one or more slots through which light from the illuminating elements pass.

8. The bi-color illuminated wheel emblem of claim 2, wherein the rechargeable battery is attached to the weight.

9. The bi-color illuminated wheel emblem of claim 8, wherein the bi-color illuminated display further comprises a non-metal look colored portion that is adjacent to the metal-look portion.

10. The bi-color illuminated wheel emblem of claim 9, wherein the metal look layer comprises a metal coated sheet.

11. The bi-color illuminated wheel emblem of claim 9, wherein the bi-color illuminated display further comprises a clear coating on top of the metal look layer.

12. The bi-color illuminated wheel emblem of claim 9, wherein the light diffusion layer comprises a plurality of tooth elements that are adapted to refract light from the illuminating elements in various directions.

* * * * *